(12) United States Patent
Constantino, Jr. et al.

(10) Patent No.: US 8,800,984 B2
(45) Date of Patent: Aug. 12, 2014

(54) CUTTING BOARD DEVICE

(76) Inventors: John Constantino, Jr., Floral Park, NY (US); John Constantino, Sr., Floral Park, NY (US)

( * ) Notice: Subject to any disclaimer, the term of this patent is extended or adjusted under 35 U.S.C. 154(b) by 139 days.

(21) Appl. No.: 13/559,971

(22) Filed: Jul. 27, 2012

(65) Prior Publication Data

US 2014/0027966 A1  Jan. 30, 2014

(51) Int. Cl.
*B23Q 3/00* (2006.01)
*A47L 15/42* (2006.01)

(52) U.S. Cl.
USPC ....... 269/302.1; 269/15; 134/115 R; 134/135; 134/200

(58) Field of Classification Search
USPC ............. 269/302.1, 15; 134/115 R, 135, 143, 134/200; 4/631
See application file for complete search history.

(56) References Cited

U.S. PATENT DOCUMENTS

| | | |
|---|---|---|
| 2,627,075 A | 2/1946 | Benson |
| 3,048,463 A | 8/1962 | Kauffman |
| 3,207,167 A * | 9/1965 | Edstrom ....................... 134/144 |
| 4,002,387 A | 1/1977 | Wolbrink |
| 4,739,781 A | 4/1988 | Casoli |
| 4,877,963 A | 10/1989 | Min-Jenn |
| 4,975,587 A | 12/1990 | Min-Jenn |
| 5,016,298 A | 5/1991 | Ris et al. |
| 5,382,009 A | 1/1995 | Mertz et al. |
| 5,546,852 A | 8/1996 | Bidwell |
| 5,915,851 A | 6/1999 | Wattrick |
| 6,095,165 A | 8/2000 | Mastronardi |
| 6,142,332 A | 11/2000 | Ferrara |
| 6,276,675 B1 | 8/2001 | Shamoon |
| 6,814,090 B2 | 11/2004 | DeBoer et al. |
| 7,134,653 B1 | 11/2006 | Ladenheim |
| 7,305,723 B2 | 12/2007 | Fulks |
| 7,390,249 B2 | 6/2008 | Sorey |
| 7,647,654 B2 | 1/2010 | Shamroth |
| 7,681,871 B2 | 3/2010 | Shew et al. |
| 7,875,122 B2 | 1/2011 | Gonska et al. |
| 2002/0095720 A1 | 7/2002 | Shamroth |
| 2003/0205256 A1 | 11/2003 | DeBoer et al. |
| 2005/0067747 A1 | 3/2005 | Erickson et al. |
| 2006/0137379 A1 | 6/2006 | Cawthon |
| 2007/0044228 A1 | 3/2007 | Fulks |
| 2009/0025417 A1 | 1/2009 | Azzara |
| 2009/0072464 A1 | 3/2009 | Ishai et al. |
| 2009/0249541 A1 | 10/2009 | Aykens et al. |

* cited by examiner

*Primary Examiner* — Joseph J Hail
*Assistant Examiner* — Jamal Daniel
(74) *Attorney, Agent, or Firm* — Brad M. Behar & Associates, PLLC

(57) ABSTRACT

The present invention is an improved cutting board device. The device allows a user to prepare food on one side of the cutting board while the other is being cleaned. The device provides a user a quick and easy transition to a new, clean, cutting board work surface without the need to carry waste to a disposal bin, without having to stop to wash and dry the soiled surface of the cutting board.

22 Claims, 12 Drawing Sheets

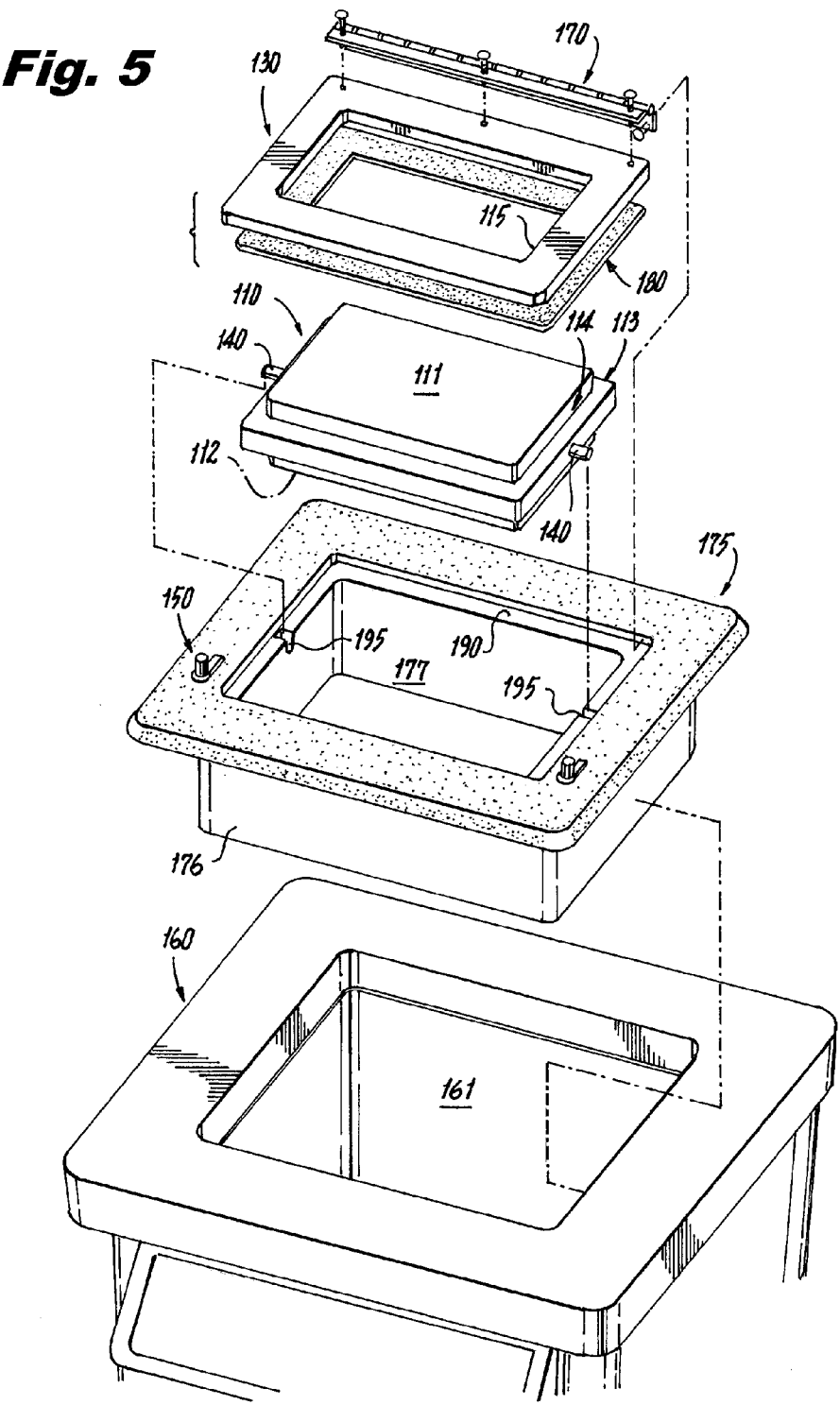

CUTTING BOARD DEVICE

FIELD OF THE INVENTION

The present invention relates generally to cutting boards and kitchen equipment, including waste disposal bins and dish washing machines. The present invention also relates to improved kitchen countertops.

BACKGROUND OF THE INVENTION

A cutting board is found in almost all kitchens, residential and commercial. They are usually stored during non-use, typically in a cabinet or closet, and taken out when needed, although some people like the aesthetics of a cutting board visible in the kitchen.

Cutting boards are used as a surface on which to prepare various types of foods, including fruits, vegetables, meats, fish, etc. A cutting board provides a flat work surface to slice, dice, chop, pare, and otherwise process foods to their desired size, shape and/or consistency. A cutting board protects the surface on which it is placed from damage during this processing. For those cutting boards that include a perimeter groove or channel, such groove or channel helps collect liquids and juices and/or stops those liquids and juices from spilling over the edge of the cutting board. The mobility of a cutting board helps with the disposal of wastes. Wastes that collect on a cutting board are disposed of by carrying the waste containing cutting board to a waste bin and dumping the waste.

Most people wipe off or clean a cutting board between uses for different foods to avoid undesirable effects, such as, for example, altering the taste of the foods. Especially when preparing certain types of raw foods, e.g., fish, beef, pork, and poultry, it is very important to properly clean a cutting board to remove bacteria (e.g. *salmonella, listeria*, and *escherichia coli*) and avoid food contamination (cross-contamination) and food-borne diseases. Sometimes it is important to clean a used cutting board to protect people with food allergies. For example, people with Celiac's disease cannot have their food come in contact with other foods or utensils that have gluten which requires a thorough cleaning of a cutting board after use with certain foods. Finally, most commercial kitchens must be compliant with health and safety laws and regulations which typically require proper cleaning of a cutting board before use for another food.

Cutting boards can be rinsed or washed either by hand or by placing them inside a dishwasher for cleaning like most other kitchen utensils. Washing a cutting board, however, adds time to the food preparation process and requires at least some movement in the kitchen from the location where the cutting board is being used to the sink and/or the dishwasher. When hand washing a cutting board, or even when using a dishwasher, time is also lost drying the cutting board. There is also a chance for improper or inadequate cleaning of the cutting board due to the washer's negligence and/or spatial limitations (e.g., the cutting board is larger than the sink and does fit therein for cleaning. In some instances, particularly in a commercial kitchen where a clean cutting board is often needed, multiple cutting boards are purchased and stored to decrease the amount of lost time. In some instances, storage space and counter space is limited. Accordingly, many users do not have the luxury of having multiple cutting boards in their kitchens or the extra counter and/or table surface areas on which to use multiple cutting boards.

In a crowded and/or cramped kitchen such as in many restaurants, delis, motor homes, fishing boats, and ship galleys, maneuvering around the kitchen when using a cutting board may pose difficulties, particularly when multiple people are working in such small spaces.

Some currently available cutting boards are reversible, offering two work surfaces, one on either side of the board.

When a cutting board is used on top of a table, such as in a catering hall buffet line, the server is continually wiping the excess juices away with a towel or cloth and the waste (fat or unwanted parts of the food) needs to be disposed of in a nearby garbage or bin. The table cloth under the cutting board usually gets soiled and dirty, an undesirable appearance at a catering event.

There is a need for an improved cutting board device, one that allows a user to easily and readily dispose of waste without having to carry the cutting board to a waste bin. There is a need for a cutting board device that is easily stored and readily accessible when needed. There is a need for a cutting board device that can be stored alone and/or integrated into an existing countertop and easily exposed and usable when needed. There is a need for a cutting board device that can be easily cleaned when not in use. There is a need for a cutting board device that allows a user to simultaneously prepare foods on one surface of the cutting board device while another adjoining surface is simultaneously being sanitized.

SUMMARY OF THE INVENTION

Applicants have invented a device with an improved cutting board and integrated disposal chamber that overcomes these and other shortcomings. While the invention will be described in connection with certain embodiments, it will be understood that the invention is not limited to those embodiments. To the contrary, the invention includes all alternatives, modifications and equivalents as may be included within the spirit and scope of the present invention.

The present invention is an about centrally pivoted chamber top having a cutting board on at least one of its surfaces, preferably two, possibly more than two depending upon the geometric shape of the chamber top, mounted at the top of a chamber. The chamber top is rotatable about its pivot on an axis near the top of the chamber allowing for easy rotation of the chamber top. The chamber top having at least one cutting board surface thereon functions as the top of the chamber according to the invention. When rotated, any waste on the chamber top falls directly into the chamber, preferably into a removable waste disposal basket or trap within the chamber. Occasionally rotating the chamber top allows for the removal from the work area of waste and excess liquid into a concealed storage chamber with less mess around the device and the surface on which it is placed. When the chamber is full or when the user is done using the device, the device's chamber is emptied and cleaned.

Another embodiment of the invention includes a sanitizing system comprising water nozzles, detergent, and the like. When activated, the sanitizing system cleans any items placed inside the chamber as well as the inside surfaces of the chamber, particularly the portion of the chamber top within the chamber.

In one embodiment of the present invention, the invention comprises a chamber having a bottom, four sides, a top, and a cover frame. The chamber could also include a removable waste basket or trap for capturing solid waste and a drainage system.

In another embodiment, the device includes a sanitizing system that comprises components typically found in a dishwashing machine, e.g., detergent dispensers, spray nozzles, heating elements, and other mechanical and electrical components including, in some embodiments, a garbage disposal unit.

In a first locked position with the cover frame secured down on the chamber top, the first side of the chamber top is exposed outside the chamber like the top surface of a kitchen countertop. The second side of the chamber top is enclosed within the chamber in this first position. The cover frame is in a picture-frame type configuration with an opening/aperture inside a surrounding frame. The cover frame secures the chamber top in a fixed position and prevents it from moving. A gasket on the underside of the cover frame seals the top of the chamber when the cover frame is closed and locked. A cutting board surface on the second side of the chamber top is exposed by unlocking and lifting the cover frame and rotating the chamber top about a pivot axis providing 360 degree rotation of the chamber top in the device. The first side of the chamber top is rotated into the chamber and the cutting board surface on the second side of the chamber top becomes the surface exposed outside the chamber within the cover frame which may then be used as a cutting board surface. Preferably, the surfaces of the chamber top are a plastic or wood surface or the like as is typically used for a cutting board surface. The surfaces of the chamber top may be made from wood, granite, marble, laminated wood, or any other surface used for kitchen countertops and/or cutting boards. When desired, with the cover frame open, the chamber top may be rotated 180 degrees allowing waste and liquids on the chamber top to drop directly into the chamber without needing to transport the cutting board to the waste bin or sink. When desired, with the chamber top and cover frame secured in place with the previously used side of the chamber top inside the chamber, the device's sanitizing system is activated spraying clean water (and detergent if desired) around the chamber rinsing and/or sanitizing the inside of the chamber, including the second side of the chamber top with the used cutting board surface.

In a preferred embodiment of the invention, the chamber top is made having a cutting board surface on two sides of the chamber top. One side of the chamber top can be rinsed or sanitized while the other side of the chamber top is in use. When a new, clean, cutting board work surface is desired, the user can quickly and easily, without having to move away from the working area and without having to clean the surface of the cutting board, unlock and lift the cover frame and rotate the chamber top about its axis to expose the clean cutting board surface at the top of the device.

In yet another embodiment of the invention, the chamber top is configured in the shape of a triangular prism or other multi-sided geometric shape to allow for more than two working surfaces which can be selected for use by rotating the chamber top.

In another embodiment of the invention, at least one of the chamber sides is configured with an access door to access the inside of the chamber. The inside of the chamber may include a removable waste trap or basket (e.g., a metal strainer type basket) and/or space for storage of additional chamber tops which may be interchangeably placed in the top of the chamber instead of the chamber top that has been removed.

Yet another embodiment of the invention comprises a device as set forth above integrated into a self contained and movable apparatus.

Yet another embodiment of the invention comprises a device made for existing countertops or tables.

Another embodiment of the invention comprises a device with two chambers, one or two sanitizing systems, two chamber tops and two cover frames integrated into one self-contained and moveable apparatus. This configuration allows two people to work at the same time on two different cutting boards on one piece of kitchen equipment.

In yet another embodiment of the invention, the device is attached to and installed immediately adjacent to a sink.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 5 is a partial exploded view of the device shown in FIG. 4.

DETAILED DESCRIPTION OF THE INVENTION

Figure 1:
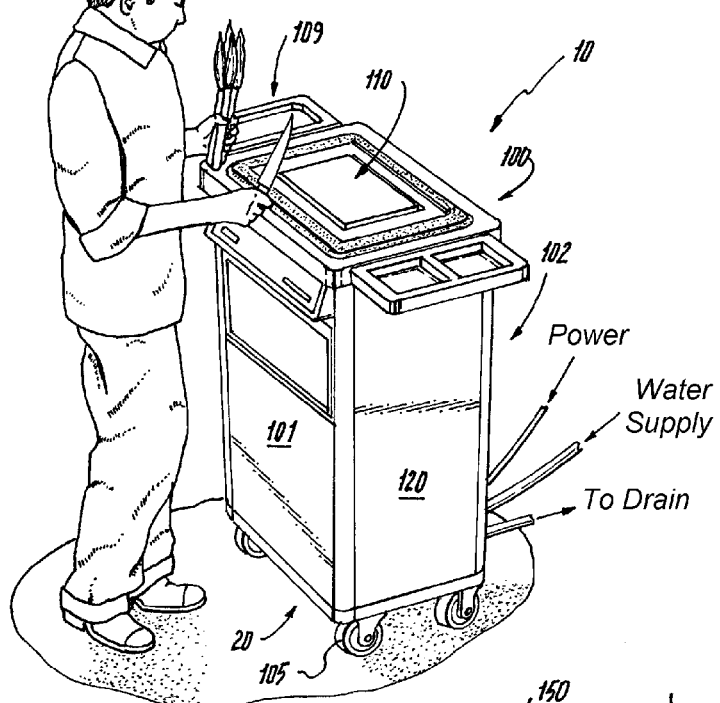
FIG. 1 is a perspective view of one embodiment of the invention with a chef in front of the device.

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

In one embodiment of the present invention, the device is a stand-alone unit that can be placed in any area of a kitchen with an accommodating footprint. A water supply line (preferably a hot water line), a drain line to a sewer or sewer system, and an electricity source are needed to use the rinsing and sanitizing features. The device comprises a housed chamber having a chamber bottom, four chamber sides, a chamber top, and a cover frame. The chamber is housed within an enclosure which includes space beneath the chamber for mechanical and electrical components. It is understood that the enclosure can be made of any one more of materials based upon aesthetics and functionality, including but not limited to stainless steel, fiberglass, plastics, etc. For most commercial kitchens a stainless steel exterior is required. The device could be on lockable wheels to allow for easy maneuvering for cleaning the kitchen and the device. Common connections for water and drain lines and electrical are in the back of the device.

The device houses a liquid heating, circulation and disposal system such as those commonly used in dishwashing machines, comprising water heating elements, spray nozzles, screens, detergent dispensers, and drainage. The chamber of the invention also comprises a solid removable waste basket or trap for capturing solid waste. The water distribution system and spray nozzle configuration within the chamber is specially configured to target the top of the inside of the chamber. Other areas within the chamber may also be targeted such as in specific embodiments including racks within the chamber for extra components, e.g. replacement chamber tops.

The inside of the chamber is accessible through at least the top of the device. The chamber top is about centrally pivoted on two opposite sides of the chamber, preferably the two sides as seen when facing the front of the device. In the preferred embodiment, the chamber top is completely removable from the chamber by lifting it out of its pivoted position. The chamber may also include access doors or drawers on one or more sides of the device much like the front door of a dishwashing machine. According to the invention, all sealed openings in the chamber are watertight when closed using gaskets and the like. For the chamber top, the cover frame includes a gasket that creates a watertight seal on the chamber top and the chamber sides. Preferably, the gasket is removable so that it can be replaced after extended periods of use as needed to maintain a clean gasket.

The chamber top is rotatably mounted on the chamber about its two pivots. The chamber top is secured in place and prevented from rotating using a cover frame that seals the perimeter of the chamber top. As shown in the figures, the cover frame is preferably in the shape of a picture frame but other configurations are possible. When the cover frame is down and in a locked position, the chamber top cannot rotate. When the cover frame is unlocked and lifted off of the chamber top, the chamber top is free to rotate about its pivot axis.

The cover frame may be completely removable from the device or it may be pivotally connected on one side of the cover frame to the top of the device with a hinge. If completely removable, the cover frame is locked onto the device using fasteners such as, for example, screws, pins, latches, etc. When hinged, the cover frame is preferably locked and unlocked into position at the side opposite the hinges also using fasteners such as screws, pins, tabs, magnets, and the like positioned on the top surface of the device, preferably not protruding on the top surface.

The cover frame includes a gasket around its bottom or lower surface. The gasket creates a watertight seal at the top of the chamber when the cover frame is locked in place. The gasket extends over both the chamber top and the chamber sides of the device.

The chamber top, when configured generally flat and two-sided, has a first surface and a second surface, and four sides. The first surface and second surface of the chamber top are generally flat. Preferably, the first surface and second surface of the chamber top include a recessed outer rim along the perimeter of the chamber top. The recessed outer rim is configured to contact the gasket on the bottom of the cover frame when closed. In certain configurations, the width of the recessed rim creates a channel or groove around the chamber top, between the edge of the recessed edge and the edge of the cover frame, when the cover frame is locked in place. The channel or groove helps collect fluids on the chamber top and to direct them into the chamber when the chamber top is rotated.

Preferably, the first surface and the second surface of the chamber top are both comprised of materials useable as a cutting board, such as plastic, wood, and the like, although the present invention also includes a chamber top with only one of the first surface or second surface having a cutting board surface. In such configurations, a second surface may be stainless steel, granite, marble or another material to match other items in the kitchen. The present invention also includes a removable storage cover (e.g., stainless steel, wood, plastic, etc.) that may be placed over the top of the device during non-use to keep the exposed surface of the chamber top clean.

The chamber top includes two pivot pins in opposing sides of the chamber top. The pivot pins are about centrally positioned in the side of the chamber top. Other structures, such as, for example. a single rod passing through the chamber top, are included in the scope of the invention. The chamber top's pivot pins are configured to fit in corresponding pivot notches located in or on opposite sides of the chamber at the top of the two chamber sides. When the chamber top is positioned in the chamber with the pivot pins in the pivot notches, the chamber top can rotate pivot axis X-X.

In a first position with the cover frame locked in position, the first surface of the chamber top is exposed on the outside of the device like the top surface of a kitchen countertop and can be used as a cutting board. Runoff that is created when food is prepared is collected and contained within the perimeter channel. The gasket on the cover frame prevents the fluid in the channel from draining into the chamber or off the first surface. The second surface of the chamber top is enclosed within the chamber forming the underside of the top of the chamber in this first position. When desired, the waste is disposed of and the clean second surface of the chamber top is exposed for use by unlocking and lifting the cover frame. The chamber top is then rotated about its pivot axis, X-X, allowing waste and liquids which have accumulated on the chamber top surface and in the channel to drop directly into the chamber without needing to transport the cutting board to the waste bin or sink. The liquid runoff accumulated at the bottom of the chamber would exit through the drainage pipes located at the bottom of the chamber while any solid debris would likewise go to the drain or in those embodiments with a solid waste trap or basket or bin (e.g., a strainer) in the chamber, the waste basket will capture the solid wastes which can be discarded by the user at any time, preferably, but not necessarily, if the waste basket is located beneath the spray nozzles, before activating the rinsing feature.

With the soiled surface of the chamber top now inside the chamber and the clean unused surface of the chamber top exposed outside the chamber (the second position) the cover frame is put back down and locked into place. The second surface of the chamber top may now be used to prepare foods while the device's rinsing/washing/sanitizing system is activated in the desired mode to either rinse or clean the used side of the chamber top. Any runoff and debris remaining on the surface of the chamber top is washed off and into the waste trap and drainage system.

The washing water, nozzles, detergent dispensers and air circulation system work in a predetermined sequence, controlled by a computerized control system, to wash, rinse and dry the chambers contents, including the surface(s) of the chamber top inside the chamber. The system includes the components typically found in a dishwashing machine.

Figure 2:
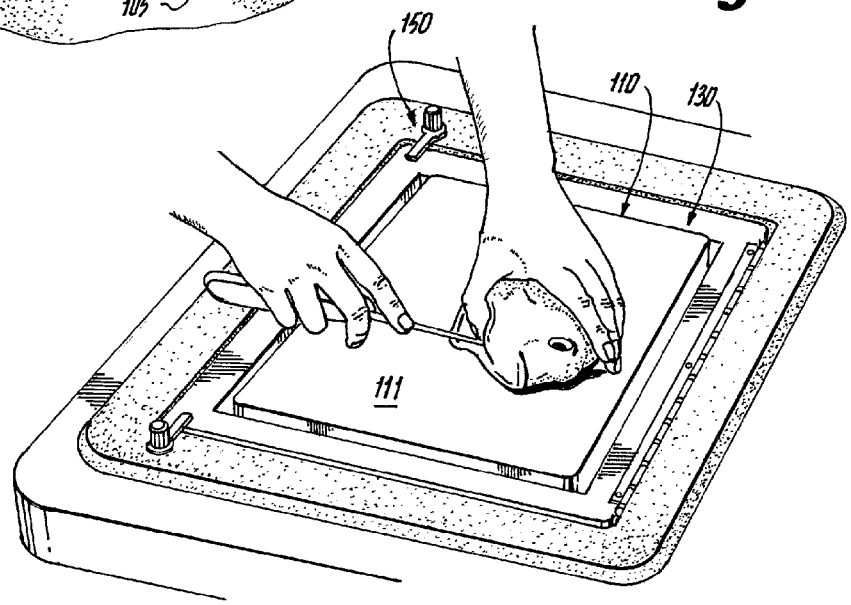
FIG. 2 is enlarged partial perspective view of the top of the device shown in FIG. 1 showing a chamber top having a cutting board with the cover frame locked and closed and with a liquid groove around the perimeter of the working surface.

Referring to the Figures, FIGS. 1 and 2 show a cook using the device 100 comprising front 101, sides 120, back 102, top 10, and bottom 20 with rollers or wheels 105. First surface 111 of the chamber top 110 is shown being used with the cover frame 130 in a locked position on chamber top 110 using fasteners 150. A water supply line is shown connected to the back 102 of the device 100 and a drain/sewer line is also connected to the back 102 of the device 100, although the device could include capped connections (e.g., threaded fitting) for attachment of these lines when desired. The power cord is shown and can be plugged into an electrical outlet. The embodiments shown in FIGS. 1-11 include a front door 103 on the device 100 for accessing the inside 105 of the chamber. In the embodiment shown in FIG. 1, the exterior of the device also includes bowls or pans 109 on either side of the device for storage of foods and/or waste.

Figure 3:
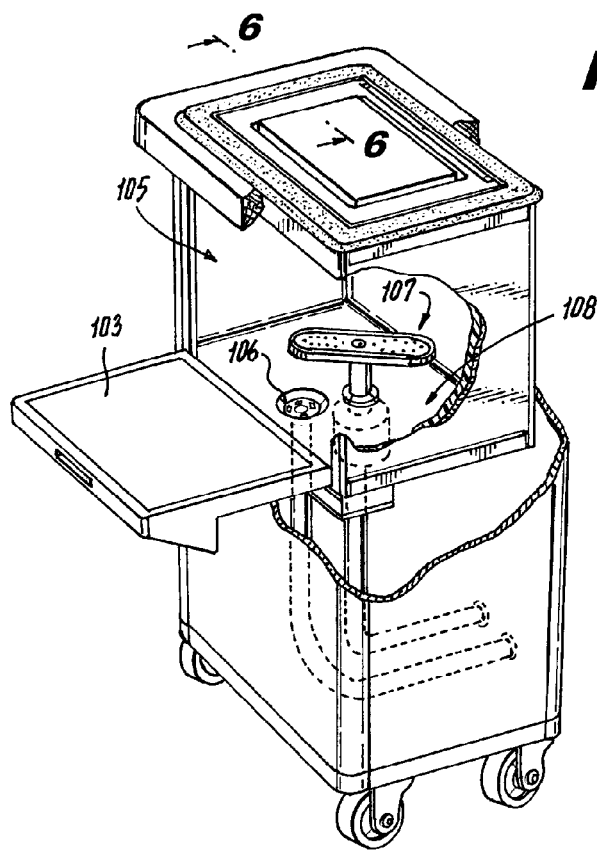
FIG. 3 is a perspective cutaway view of a device according to the invention with a front access door open and showing inner washing components and drain components.

FIG. 3 shows a partially broken away view of device 100 with side bowls or pans 109 on either side of the device removed. The inside 105 of the chamber comprises a drain 106 and a spray nozzle 107, it being understood that the invention is not limited to the one spray nozzle configuration shown and includes many other variations and configurations including spray nozzles with the walls of the chamber sides directed at the chamber top. The bottom 108 of the inside of the chamber 105 is preferably sloped (not shown) towards the drain 106 which, in most commercial kitchens, connects to an indirect waste line to prevent backups; the present invention helps collect waste and limits the amount of waste in the indirect waste line. Inside the device below the chamber are the mechanical and electrical components for heating the water, controlling the dispensing of detergent, and draining the water. Components common to dishwashers, such as, for example, heating elements, pumps, valves, a control panel 40 and electronics, are not shown but are included in the invention.

Figure 4:
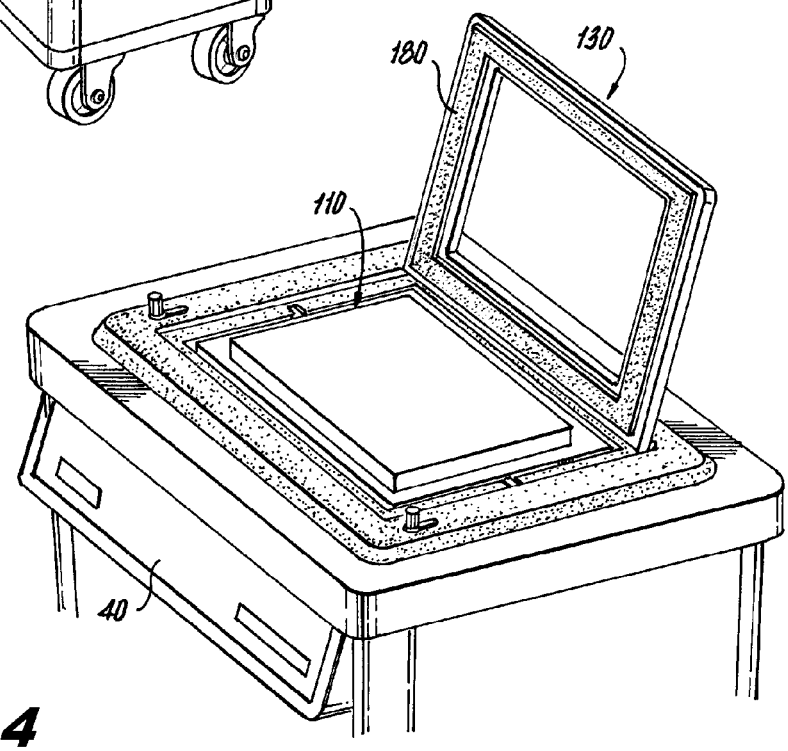
FIG. 4 is a partial perspective view of a device shown in FIG. 3 with the cover frame unlocked and open showing a gasket on the underside of the cover frame.

FIG. 4 shows the device 100 with cover frame 130 unlocked and lifted off of chamber top 110. Gasket 180 is shown attached to the underside of cover frame 130.

Figure 5A:
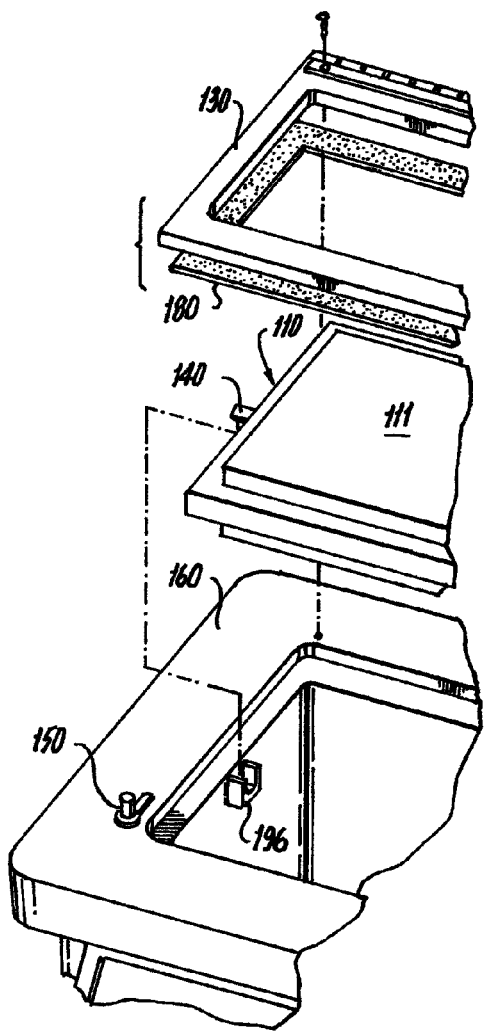
FIG. 5A is a partial exploded view of the device shown in FIG. 4 with an alternative pivot support configuration in the walls of the chamber.
Figure 6:
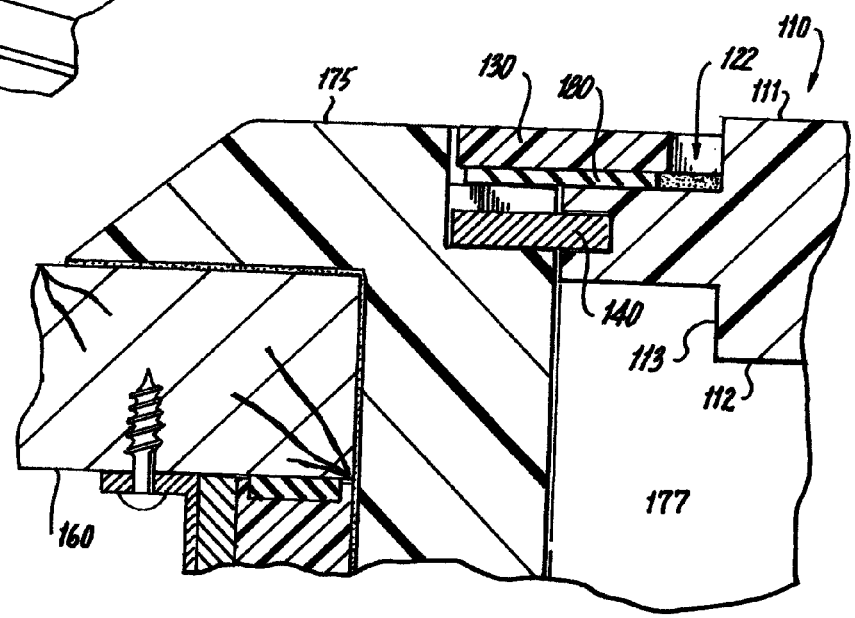
FIG. 6 is a partial section view taken at line 6-6 in FIG. 3 showing device components.

FIG. 5 is a partial exploded view of device 100. FIG. 5 shows an upper frame 160 with an aperture 161 therein configured to receive therein the bottom portion 176 of sleeve 175. Sleeve 175 has an internal aperture 177 within which chamber top 110 fits. Pivots pins 140 on chamber top 110 fit within pivot notches 195 within the sleeve 175. Alternatively, as shown in FIG. 5A, pivot brackets 196 can be used on the inside surface of the chamber wall in place of a pivot notch. Chamber top 110 can be rotated 360 degrees about the axis X-X formed by the pivots when in place. Cover frame 130 with gasket 180 removably attached is pivotally attached to sleeve 175 using hinge 170. When cover frame 130 is locked on top of chamber top 110 using fasteners 150, gasket 180 seals the top of the recessed ridge ring 113 and the inner lip 190 on sleeve 175 as shown in FIG. 6, along the entire perimeter of the aperture in sleeve 175. The channel formed between the inner side wall 115 of the cover frame 130 and the side wall 114 on the chamber top 110 formed by the ridge ring functions to collect and retain liquids.

Figure 7:
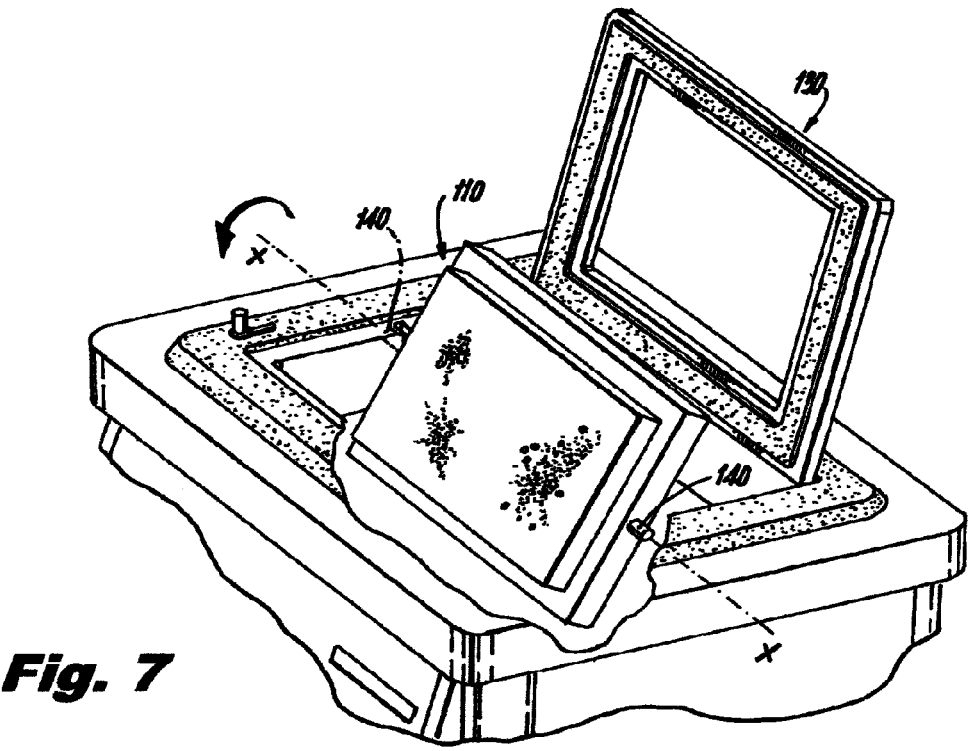
FIG. 7 is a partial perspective view of the device showing the cover frame unlocked and open and also showing the chamber top rotated from its original position about axis X-X.
Figure 8:
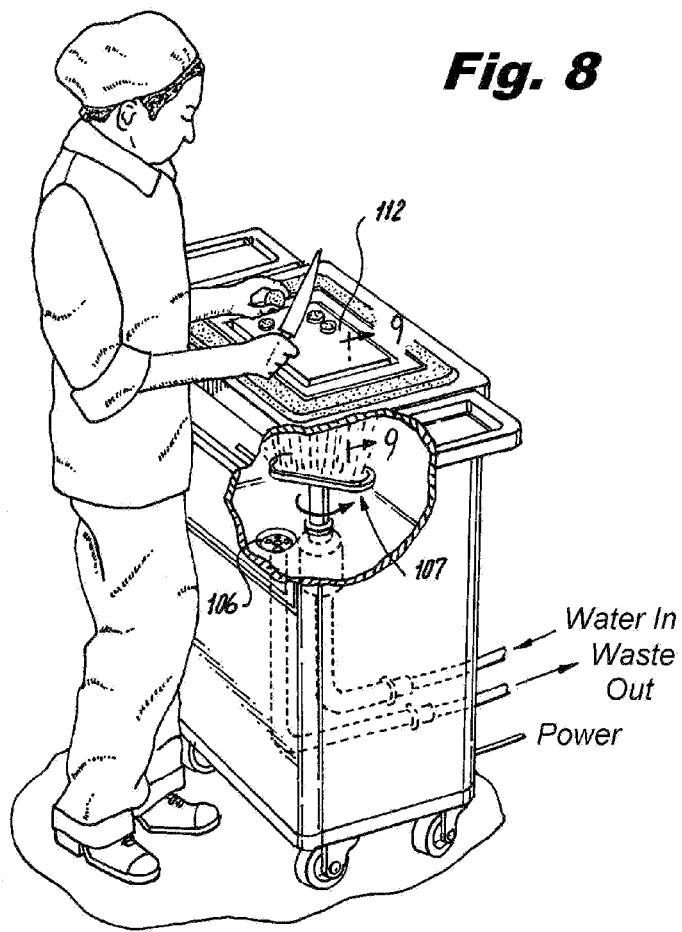
FIG. 8 is a cutaway perspective view of one embodiment of the invention with a chef in front of the device using the top surface to prepare food while the device is in use for cleaning the other side of the chamber top.
Figure 9:
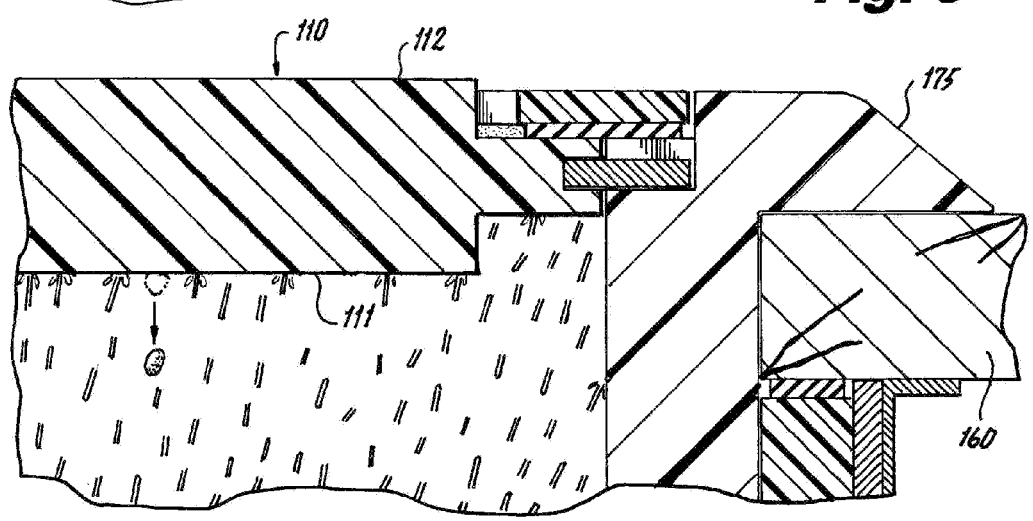
FIG. 9 is an section view taken at line 9-9 in FIG. 8 showing the device components in cross section while in use to clean the chamber top.

When fasteners 150 are unlocked and cover frame 130 is pivotally rotated about hinge 170 off chamber top 110 as shown in FIG. 7, chamber top 110 is free to rotate about axis X-X thereby dropping waste solids and fluids into the inside 105 of the chamber from first side 111 as the second side 112 of chamber top 110 is rotated into position. The second surface 112 of the chamber top 110 can then be used for another food. The user can subsequently flip back to the first surface 111 to prepare more of the same food previously used on the first surface 111 (e.g., vegetables) or the user can wash, rinse, and/or sterilize first surface 111 before using it again. As shown in FIGS. 8 and 9, with the cover frame 130 back in the locked position, the cook can activate the rinse or sanitize function of the device thereby cleaning first surface 111 while using second surface 112 of chamber top 110. Spray nozzle 107 spins and sprays water on first surface 111 and if selected by the user, detergent is dispensed also to sanitize the first surface 111.

Pivot notches 195 may include ball bearings (not shown) to reduce wear between pivot notches 195 and pivot pins 140 and ease the movement of pivot pins 140 in pivot notches 195. Pivot notches 195 could also include motorized gears with teeth to engage complementary grooves found on pivot pins 140 so as to allow the motorized rotation of chamber top 110 about axis X-X. Pivot notches 195, rather than being positioned towards the top end of the chamber may be positioned lower in the chamber. The pivot notches 195 may also be made with a height adjustment allowing the user to vary the position of pivot notches 195 and thereby vary the height of the chamber top 110 within chamber also allowing use of cutting boards having different configurations as shown for a three sided chamber top in FIG. 14.

Figure 10:
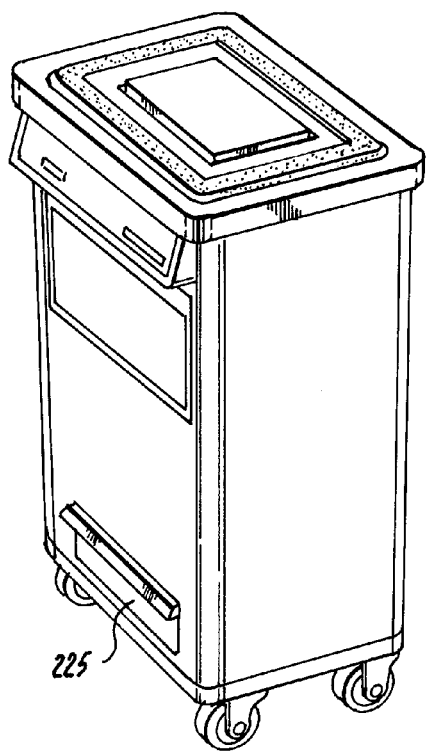
FIG. 10 is a perspective view of another embodiment of the invention with a front storage drawer under the chamber for additional chamber tops.
Figure 11:
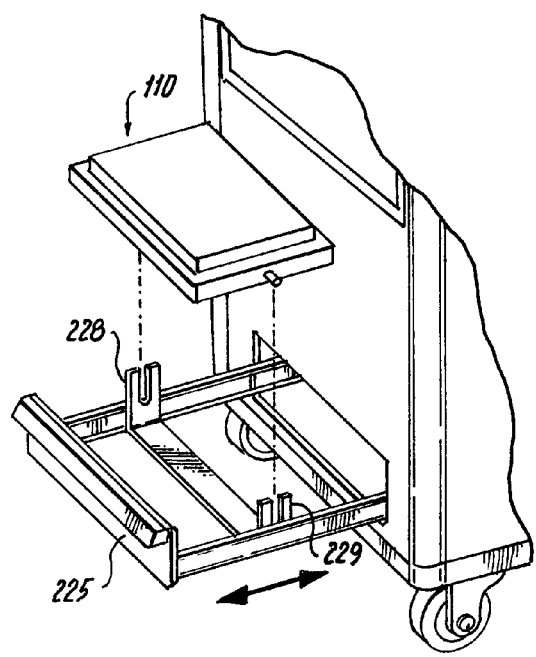
FIG. 11 is a partial perspective view of the device of FIG. 10 with the draw shown in an open position and with a chamber top above the drawer.

Another embodiment of the invention including a drawer 225 for storage of extra chamber tops 110 having cutting board surfaces is shown in FIGS. 10 and 11. Preferably, the drawer 225 includes rails 229 and at least one mounting rack 228.

Figure 12:
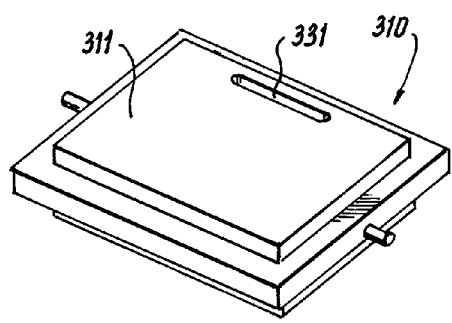
FIGS. 12-16 show alternative configurations for chamber tops that can be used in the device according to the invention.
Figure 13:
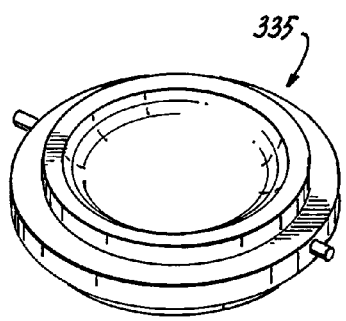
Figure 14:
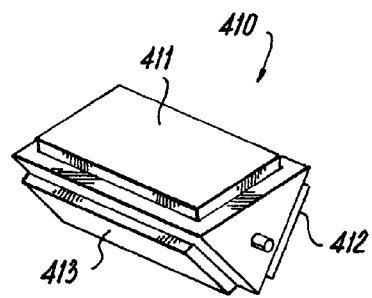

The present invention is not limited to only the generally flat, two-sided chamber top configuration. FIGS. 12-16 show alternative embodiments for the chamber top including an additional groove 331 in at least a first surface 311 of the chamber top 310 as shown in FIG. 12. FIG. 13 shows a chamber top 335 configured in an about round shape which could be used with an corresponding about round cover frame, FIG. 14 shows a chamber top 410 shaped in an about triangular prism configuration with a first surface 411, a second surface 412, and a third surface 413.

Figure 15:
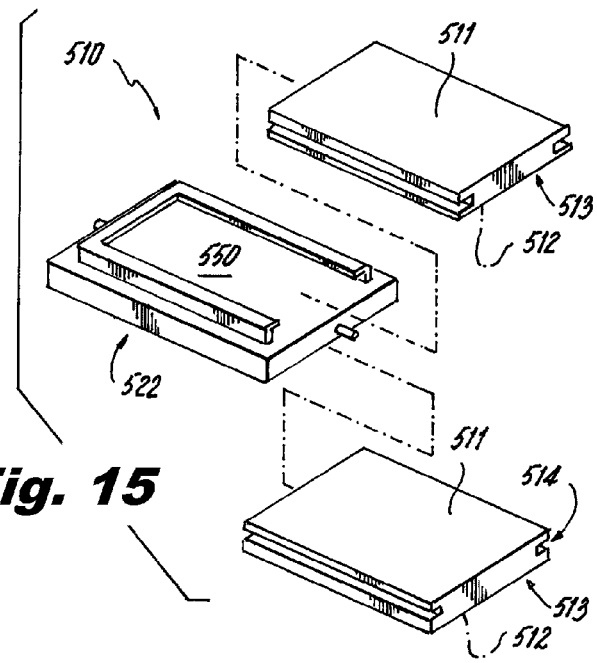
Figure 16:
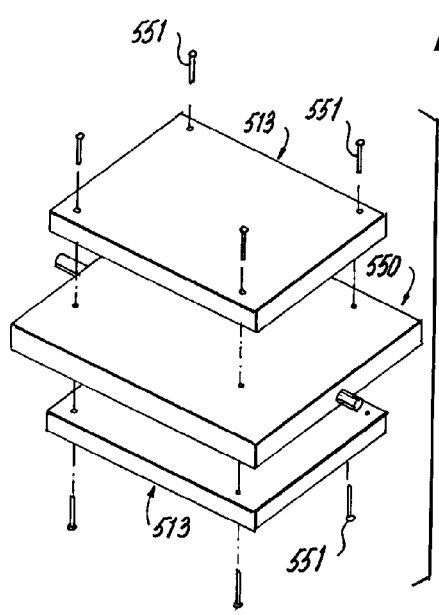

FIGS. 15 and 16 show yet other embodiments for a chamber top 510 with removable components. In FIG. 15 inserts 513 each have a first surface 511 and a second surface 512 on opposite sides. Along at least two sides of inserts 511 are grooves 514 configured to receive channel 522 on chamber top middle section 550 such that insert 513 can be removably connected to middle section 550 on at least one side of middle section 550. Other removable devices and systems besides a channel and groove system can be used to attach inserts to a middle section 511. For example, without limitation, as shown in FIG. 16, screws 551 can be used to attach the inserts 513 to the middle section 550.

Figure 17:
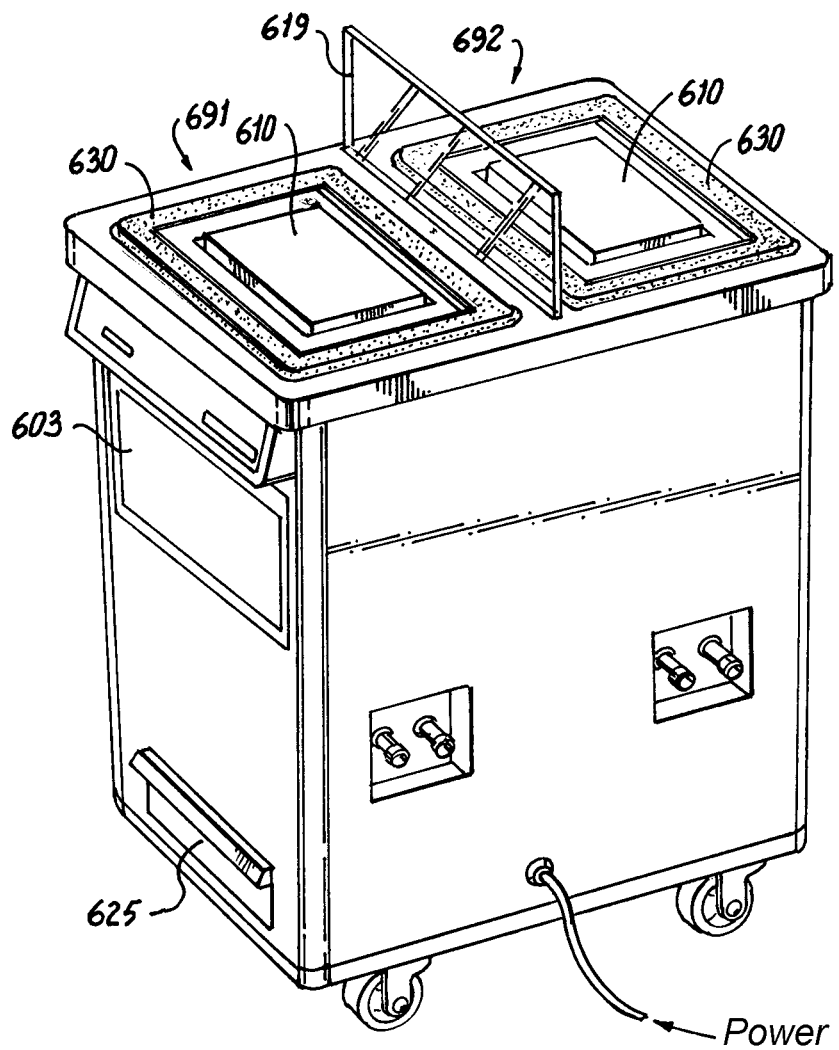
FIG. 17 is a perspective view of a single device according to the invention configured with two work stations for use by two individuals at the same time.

Another embodiment of the invention particularly useful in commercial kitchens where two people can use the device at the same time is shown in FIG. 17. The embodiment shown in FIG. 17 has two face-to-face workstations built into one device. A splash separator 619 separates one station 691 from a second station 692. As in other embodiments, chamber tops 610 are pivotally mounted in the sleeve, and cover frames 630 serve to secure the chamber tops 610 in place when the cover frames 630 are locked using the fasteners. In the embodiment shown in FIG. 17, the cover frames 630 are secured in place using magnet fasteners hidden on the underside of the cover frames 630 and corresponding magnets in the inner lip of the sleeve at the side opposite the hinge (not shown). Other fastening systems such as, for example, spring loaded latches or metal rods and hooks are within the scope of the invention.

According to any of the aforementioned embodiments the device could be used anywhere without connections to water, drain, and/or an electrical source and then connected to a power source, a water line, and a drain line when the user wants to utilize the rinsing and/or sterilizing features. Some examples include outdoors, in catering halls at a hot food station, etc. The device can be stored in a closet when not in use.

Figure 18:
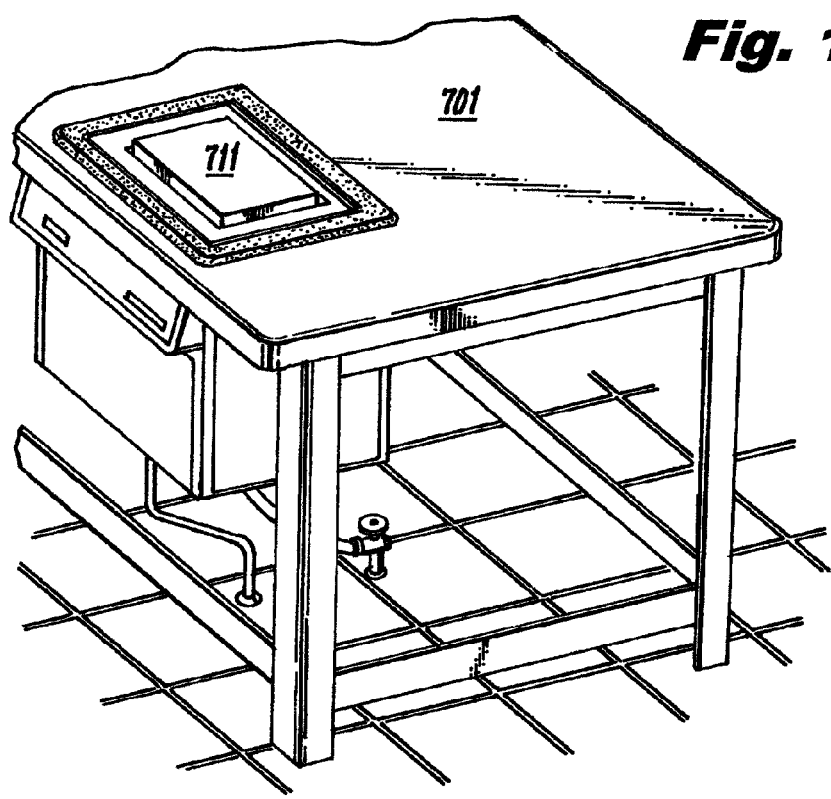
FIG. 18 is a perspective view of a device according to the invention configured for an existing table or countertop shown installed.
Figure 18A:
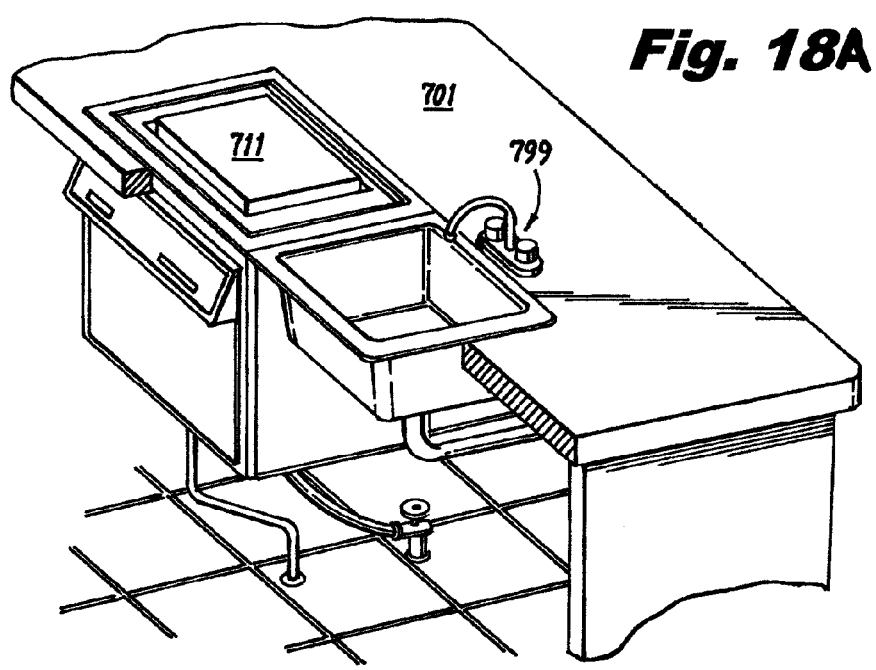
FIG. 18A is a perspective view of a device according to the invention configured for an existing table or countertop shown installed immediately adjacent to a sink.
Figure 19:
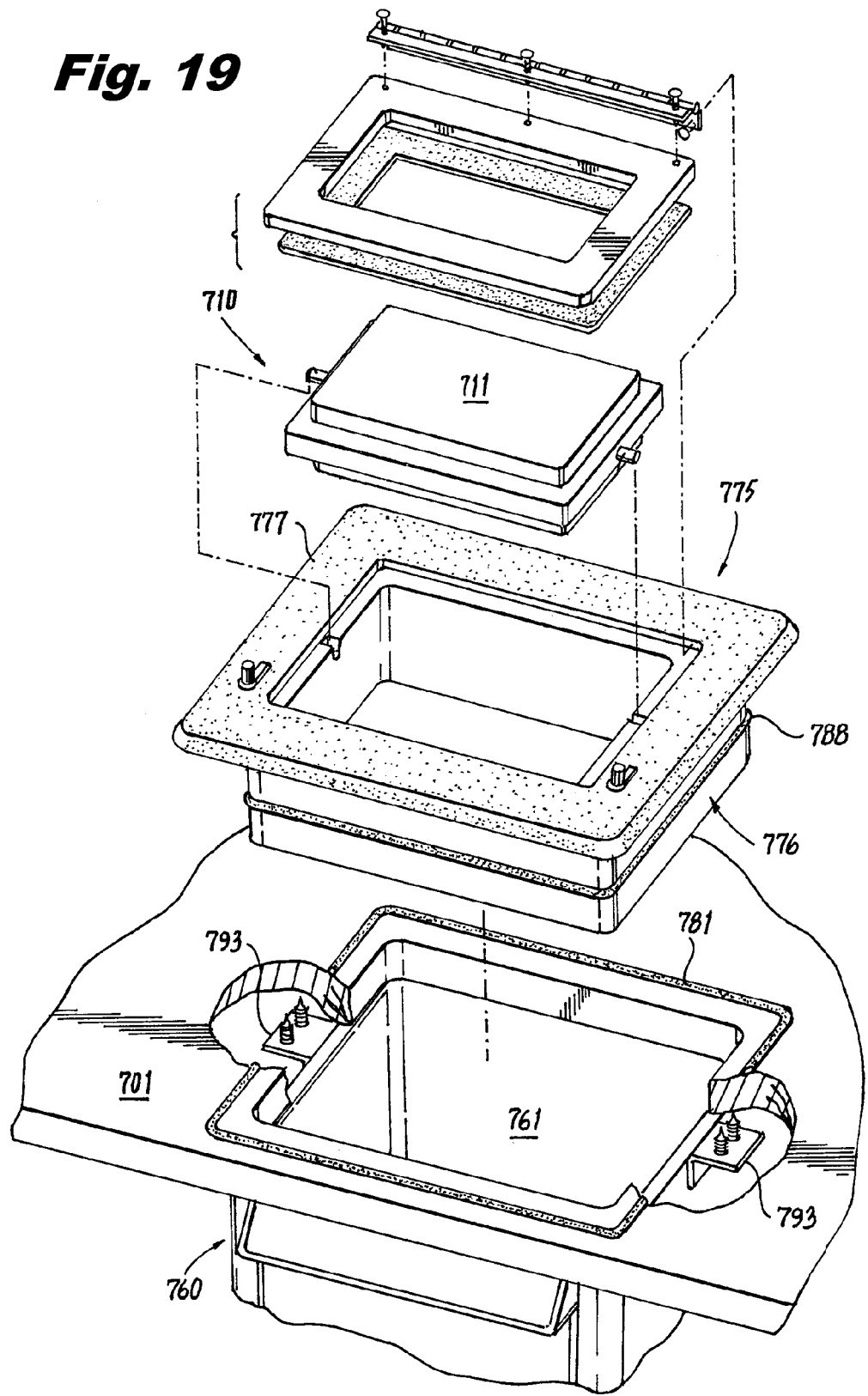
FIG. 19 is a partial exploded view of the device shown in FIG. 18.

In another embodiment of the invention, the device is a configured to be installed onto/into and within an existing table or countertop as shown, for example, in FIGS. 18, 18A and 19. The device is configured with fastening brackets 793 integrated into the upper frame 760. Also attached to the upper frame 760 is a sealing gasket 781 to seal the upper frame 760 to the underside of the table or countertop 701. Alternatively, other types of fastening brackets and clips common to under mount sinks can be used to secure the upper frame 760 to the underside of the table or countertop 701. Caulk or other adhesive may also be used to secure the device in place. A sealing gasket around the perimeter of the bottom portion 776 of the sleeve 775 forms a seals between the bottom portion 776 of sleeve 775 and the inside 761 of the chamber. Adhesive or caulk (not shown) can be used to secure the sleeve 775 to the table or countertop. The lip 777 on sleeve 775 could be used to support the weight of the entire device as shown in FIGS. 18 and 19 or legs (not shown) can be included under the device to support it from underneath.

In the embodiment of the invention made for placement into an existing surface, it may be particularly desirable to replace the chamber top 710 with a decorative board made from, for example, the same material that the countertop or table top in which the device is installed to conceal it, for example, wood, granite, marble, Coreian, Formica, and any others. When used as a decorative, non-working surface for storage, the chamber top may be configured without any space between the cover frame and the chamber top for the liquid channel as it is not needed and would detract from the utility of a countertop.

In the embodiment shown in FIG. 18A, the device is shown directly next to and attached to a sink 799. Such an embodiment is useful if the device with a sink is installed in place of a large sink or a double sink in an existing kitchen.

Figure 6A:
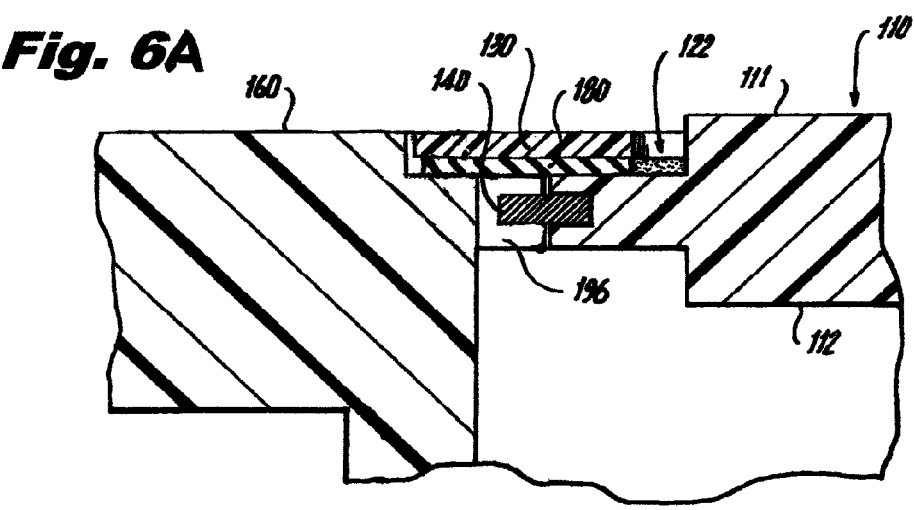
FIG. 6A is a partial section view taken at line 6-6 in FIG. 3 showing device components modified for a single walled construction such as for use of the device in a countertop.

In another embodiment of the invention, not shown, the device is a flush mount type configuration without a sleeve. For example, in the embodiment shown in FIG. 5, the device would be made without sleeve 175 with an inner lip 190 located on the inside of the upper frame 160. The fasteners 150 would be repositioned on the upper most surface of the upper frame. Such a configuration is shown in cross section in FIG. 6A for a configuration with the pivot mounts on the side of the chamber as shown in FIG. 5A.

In any of the aforementioned embodiments, a removable waste trap or basket can be included at the drain or above the drain. A removable waste basket in the form of a strainer can also be mounted above the drain and/or spray nozzles. The waste basket could be removed through the access door and emptied into a waste bin before or after activating the device. The waste basket would be fine enough to prevent large solid particles from passing through while still allowing water to pass through easily. A garbage disposal device/unit may also be incorporated into the device in lieu of, or in addition to, the waste trap. A garbage disposal unit can be installed under the drain or otherwise in line with the drain line. The waste trap and/or the garbage disposal helps stop the drain line from clogging.

The number and position of spray nozzles within the chamber may be varied according to the configuration of the chamber top being used in the device. The spray direction needed to contact the surfaces of the chamber top within the chamber will dictate the nozzle configuration.

It is also contemplated within the scope of the invention to have a slidable storage drawer or a door within the chamber or beneath the chamber for additional chamber tops. The additional chamber tops may be stored in a horizontal or vertical position, although it is preferred that the cutting boards be stored in a vertical position, thereby maximizing the number of chamber tops that may be stored and cleaned.

Figure 20:
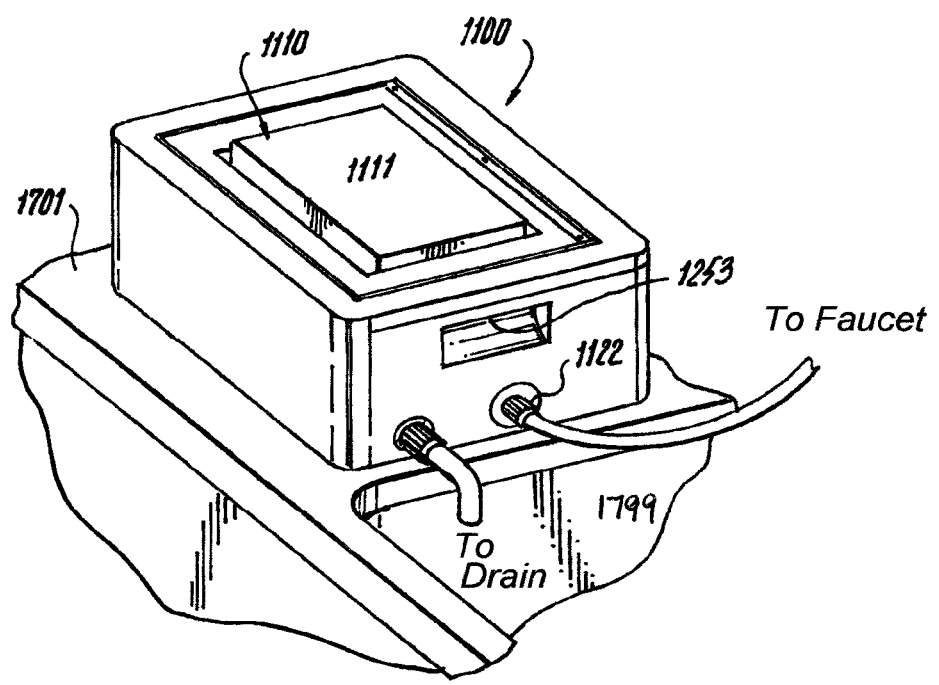
FIG. 20 is another embodiment of the invention, a portable device shown next to a sink and connected to a faucet for cleaning and draining.

FIG. 20 show yet another embodiment of the invention. Device 1100 is shown on top of a table 1701 next to a sink 1799. The device 1100 is a portable unit without any rinsing or sanitizing components having handles 1253. The device include external connections and valves 1122 to connect hoses to the device for cleaning. With the valves 1122 closed, the device can be used anywhere, such as, for example, on a buffet line for a catering hall. The user can continuously and easily dump the waste and liquids into the chamber of the device during use of the cutting board surface 1111 by rotating the chamber top 1110. When use of the device 1100 is done, the waste is removed from inside the chamber through an access door (not shown) or by removing the chamber top 1110 and inverting the device. The device may also can rinsed clean by connecting hoses to the drain and fill lines on the side of the device and opening the valves 1122.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

We claim:

1. An improved cutting board device with an integrated disposal and sanitizing system comprising:
   a liquid heating, circulation, and disposal system comprising spray nozzles and a detergent dispensing system;
   a water tight chamber connected to said liquid heating, circulation, and disposal system for rinsing the inside of said chamber, said chamber comprising a removable chamber top and cover frame, a chamber bottom, and four chamber sides, wherein said chamber top is rotationally mounted on an about centrally located axis on said chamber;

said cover frame configured to removably attach to an outside perimeter of said chamber top when said cover frame is positioned on said chamber top with a portion of said chamber top positioned through an aperture in said cover frame, said cover frame pivotally hinged on the top of one of said chamber sides with a gasket removably attached to the bottom of said cover frame;

locking fasteners at the top of said device for locking said cover frame down in a closed position, said gasket on said cover frame sealing said chamber when said cover frame is in a closed position and locked;

wherein when said cover frame is in an open position said chamber top is rotatable 360 degrees about said axis formed by two about centrally positioned pivot pins on opposite sides of said chamber top;

wherein said chamber top comprises at least one surface capable of being positioned within said aperture of said cover frame when said cover frame is in a closed position.

2. The device according to claim 1, wherein said chamber top comprises at least two surfaces capable of being positioned in said aperture of said cover frame when said cover frame is in a closed position.

3. The device according to claim 2, wherein said chamber top further comprises a recessed ridge ring around the perimeter of said chamber top.

4. The device according to claim 3, further comprising a liquid channel on the top of said device when said cover frame is locked in a closed position.

5. The device according to claim 2, wherein a first surface of said chamber top is positioned inside said chamber and can be rinsed within said chamber while a second surface of said chamber top is used to prepare food outside said chamber.

6. The device according to claim 5, wherein said first surface of said chamber top and said second surface of said chamber top are cutting boards.

7. The device according to claim 1, wherein said fasteners are at least one from the group consisting of screws, pins, levers, hooks, and magnets.

8. The device according to claim 1, wherein said at least one surface of said chamber top is a plastic cutting board.

9. The device according to claim 8, wherein one of said at least one surface of said chamber top is a decorative surface.

10. The device according to claim 1, further comprising a removable strainer-type waste basket within said chamber.

11. The device according to claim 1, further comprising a garbage disposal unit in line with a waste or drain line from a bottom of said chamber.

12. The device of claim 1, wherein said chamber top comprises three surfaces capable of being positioned in said aperture of said cover frame when said cover frame is in a closed position.

13. The device according to claim 12, wherein said chamber top further comprises a ridge ring around the perimeter of said chamber top forming a channel on the top surface of said device when said cover frame is locked in a closed position.

14. The device according to claim 12, wherein a first surface of said chamber top and a second surface of said chamber top can be rinsed within said chamber while a third surface of said chamber top is used.

15. The device according to claim 1, wherein said chamber top comprises at least one removable insert, said at least one insert having a first surface, a second surface, and four sides, wherein at least two sides of said at least one insert includes a groove configured to receive a corresponding channel on a middle section of said chamber top.

16. The device according to claim 15, wherein said chamber top comprises two removable inserts on two sides of said middle section of said chamber top.

17. The device according to claim 1, wherein said device further comprises a front access door and storage racks within said chamber configured to hold chamber tops.

18. The device according to claim 1, wherein said device further comprises a drawer beneath said chamber configured to hold chamber tops.

19. An improved cutting board device with an integrated disposal chamber comprising:

a water tight chamber, said chamber comprising a removable chamber top and cover frame, a chamber bottom, and four chamber sides, wherein said chamber top is rotationally mounted on an about centrally located axis on said chamber;

said cover frame configured to removably attach to an outside perimeter of said chamber top when said cover frame is positioned on said chamber top with a portion of said chamber top positioned through an aperture in said cover frame, said cover frame pivotally hinged on the top of one of said chamber sides with a gasket removably attached to the bottom of said cover frame;

locking fasteners at the top of said device for locking said cover frame down in a closed position, said gasket on said cover frame sealing the top of said chamber when said cover frame is in a closed position and locked;

wherein when said cover frame is in an open position said chamber top is rotatable 360 degrees about said axis formed by two about centrally positioned pivot pins on opposite sides of said chamber top;

wherein said chamber top comprises at least one surface capable of being positioned within said aperture of said cover frame when said cover frame is in a closed position.

20. The device according to claim 19, wherein said chamber top comprises at least two surfaces capable of being positioned in said aperture of said cover frame when said cover frame is in a closed position.

21. The device according to claim 20, wherein said device further comprises at least one valve connected to said chamber for drainage.

22. An improved cutting board device with an integrated disposal and sanitizing system comprising:

a liquid heating, circulation, and disposal system comprising spray nozzles and a detergent dispensing system;

a water tight chamber connected to said liquid heating, circulation, and disposal system for rinsing the inside of said chamber, said chamber comprising:

a chamber bottom;

four chamber sides comprising an upper frame at the tops of said four chamber sides with an aperture thru said upper frame configured to receive a bottom portion of a sleeve;

a sleeve with a bottom configured to fit inside the aperture in said upper frame, said sleeve comprising an internal aperture configured to hold a removable chamber top, wherein said chamber top is rotationally mounted on an about centrally located axis on said chamber; and a cover frame configured to removably attach to an outside perimeter of said chamber top wherein a portion of said chamber top fits through an aperture in said cover frame, said cover frame pivotally hinged on said sleeve with a gasket removably attached to the bottom of said cover frame;

locking fasteners at the top of said device for locking said cover frame down in a closed position, said gasket on said cover frame sealing the chamber top on said chamber when said cover frame is in a closed position and locked;

wherein when said cover frame is in an open position said chamber top is rotatable 360 degrees about said axis formed by two about centrally positioned pivot pins on opposite sides of said chamber top; and wherein said chamber top comprises at least one surface capable of being positioned within said aperture of said cover frame when said cover frame is in a closed position.

\* \* \* \* \*